United States Patent [19]
Weigle

[11] Patent Number: 4,967,650
[45] Date of Patent: Nov. 6, 1990

[54] APPLIANCE FOR PREPARING TWO WAFFLES

[76] Inventor: Barbara Weigle, 149-19 15th Dr., Whitestone, N.Y. 11357

[21] Appl. No.: 401,157

[22] Filed: Aug. 31, 1989

[51] Int. Cl.$^5$ .............................................. A47J 37/00
[52] U.S. Cl. ........................................ 99/374; 99/375; 99/377; 99/424
[58] Field of Search ................. 99/374, 355, 377, 375, 99/380, 382, 443 R, 372, 342, 373; 219/524, 525

[56] References Cited
U.S. PATENT DOCUMENTS

| | | | |
|---|---|---|---|
| 2,116,688 | 5/1938 | Ratliff | 99/377 |
| 2,354,240 | 7/1944 | Young et al. | 99/375 |
| 3,999,473 | 12/1976 | Carbon | 219/524 |
| 4,075,940 | 2/1978 | Carbon | 99/377 |
| 4,803,918 | 2/1989 | Carbon et al. | 99/374 |

Primary Examiner—Timothy F. Simone
Attorney, Agent, or Firm—Michael I. Kroll

[57] ABSTRACT

An appliance for preparing two waffles is provided and consists of a housing assembly formed into a double waffle maker which can manually swivel in a 180° limit above a supportive base member so that waffle batter can be poured therein for preparing the two waffles.

1 Claim, 1 Drawing Sheet

U.S. Patent
Nov. 6, 1990
4,967,650
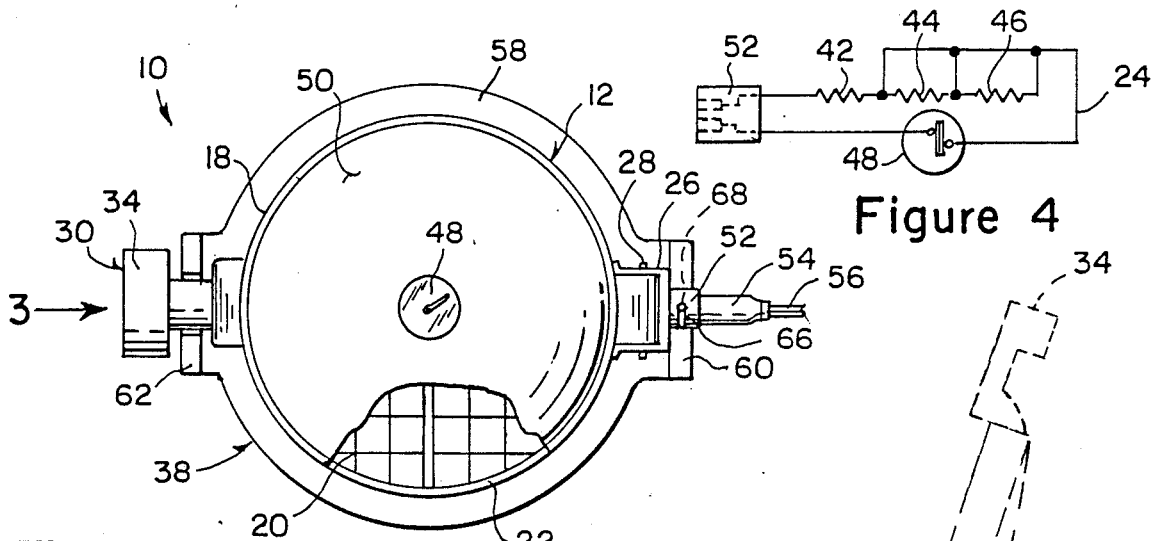
Figure 1
Figure 4
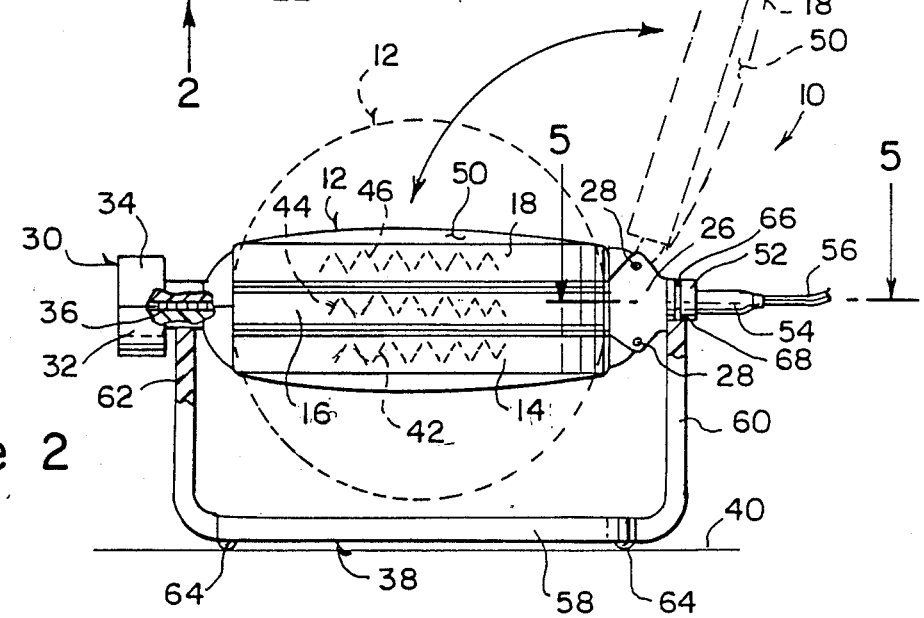
Figure 2
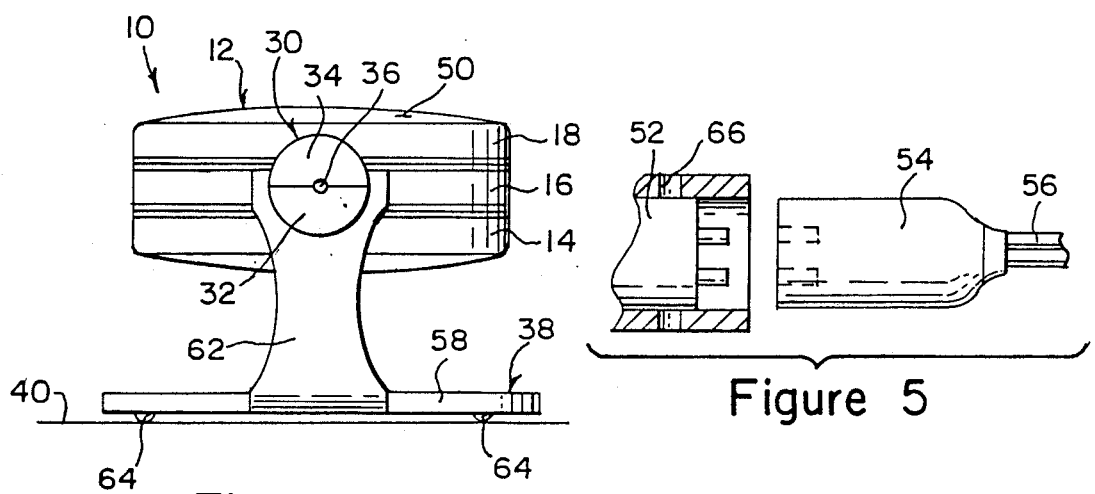
Figure 3
Figure 5

APPLIANCE FOR PREPARING TWO WAFFLES

BACKGROUND OF THE INVENTION

1. Field of the Invention

The instant invention relates generally to waffle makers and more specifically it relates to an appliance for preparing two waffles.

2. Description of the Prior Art

Numerous waffle makers have been provided in prior art that are adapted to prepare one waffle at a time. While these units may be suitable for the particular purpose to which they address, they would not be as suitable for the purposes of the present invention as heretofore described.

SUMMARY OF THE INVENTION

A primary object of the present invention is to provide an appliance for preparing two waffles that will overcome the shortcomings of the prior art devices.

Another object is to provide an appliance for preparing two waffles that includes a housing assembly formed into a double waffle maker which manually swivels above a supportive base member so that waffle batter can be poured therein for preparing the two waffles.

An additional object is to provide an appliance for preparing two waffles in which the housing assembly is limited in only swiveling 180° above the supportive base member.

A further object is to provide an appliance for preparing two waffles that is simple and easy to use.

A still further object is to provide an appliance for preparing two waffles that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the invention with parts broken away.

FIG. 2 is a front view taken in direction of arrow 2 in FIG. 1 with parts broken away.

FIG. 3 is a side view taken in direction of arrow 3 in FIG. 1.

FIG. 4 is a schematic view of the electrical circuit of the thermostat therein.

FIG. 5 is an enlarged exploded cross sectional view taken along line 5—5 in FIG. 2 showing the cylindrical socket and removable plug in greater detail.

DETAILED DESCRIPTION OF THE PREFERRED EMBODIMENTS

Turning now descriptively to the drawings, in which similar reference characters denote similar elements throughout the several views, FIGS. 1 through 4 illustrate an appliance 10 for preparing two waffles, consisting of a housing assembly 12 that has a bottom housing section 14, a middle housing section 16 and a top housing section 18. The bottom housing section 14 and the top housing section 18 each have a waffle grid pattern 20 with an annular groove overflow 22 while the middle housing section 14 also has two oppositely disposed waffle grid patterns 20, each with an annular groove overflow 22. A circuit 24 is for electrically heating the waffle grid pattern 20 in the bottom housing section 14, the middle housing section 16 and the top housing section 18.

A hinge assembly 26 is affixed to one side of the middle housing section 16 with the bottom housing section 14 and the top housing section 18 pivotly connected at pivot pins 28 to the hinge assembly 26.

A swivel knob assembly 30 is provided having a lower half segment 32 affixed at opposite side of the bottom housing section 14, an upper half segment 34 affixed to the top housing section 18 and a central rod 36 extends from the middle housing section 16 between the lower half segment 32 and the upper half segment 34.

A structure 38 is also provided for supporting the hinge assembly 26 and the swivel knob assembly 30 in an elevated position with respect to a flat surface 40 and allows the housing assembly 12 to swivel thereabout. The housing assembly 12 is limited to manually swivel 180° so that when the housing assembly 12 is in a first position with the bottom housing section 14 on top, the bottom housing section is opened allowing waffle batter to be poured onto one of the waffle grid patterns 20 in the middle housing section 16 and then the bottom section 14 is closed. The housing assembly 12 is then swiveled back to a second position with the top housing section 18 on top, the top housing section 18 is opened allowing waffle batter to be poured onto other of the waffle grid patterns 20 in the middle housing section 16 and the top housing section 18 is then closed allowing the two waffle to be prepared.

As best seen in FIG. 4, the electrical circuit 24 includes a first heating element 42 disposed into the bottom housing section 14, a second heating element 44 disposed into the middle housing section 16, a third heating element 46 disposed into the top housing section 18. A thermostat 48 is electrically connected to the first heating element 42, the second heating element 44 and the third heating element 46 and disposed into top wall 50 of the top housing section 18. The thermostat 48 indicates when the waffle are done. A cylindrical socket 52 is mounted to side of the hinge assembly 26 and is electrically connected to the flat heating element 42, the second heating element 44, the third heating element 46 and thermostat 48 so that a plug 54 on an electrical cord 56 can be electrically connected thereto (see FIG. 5).

The support structure 38 includes a base member 58 that has a pair of cradle arm 60 and 62 vertically extending upwardly at opposite sides thereof. One of the cradle arms 60 swivelly supports the socket 52 while other of the cradle arms 62 swivelly supports the swivel knob assembly 30. A plurality of feet 64 are disposed to underside of the base member 58 so as to stabilize the base member on the flat surface 40.

The socket 52 has an annular slot 66 formed therein at 180° thereabout while a pin 68 is disposed in the socket cradle arm 60. The pin 68 fits into the annular slot 66 to limit swivel movement of the socket 52.

LIST OF REFERENCE NUMBERS 10 appliance
12 housing assembly
14 bottom housing section 16 middle housing section
18 top housing section
20 waffle grid pattern
22 annular groove overflow
24 electrical circuit
26 hinge assembly
28 pivot pin
30 swivel knob assembly
32 lower half segment
34 upper half segment
36 central rod
38 support structure
40 flat surface
42 first heating element
44 second heating element
46 third heating element
48 thermostat
50 top wall of top housing section
52 cylindrical socket
54 removable plug
56 electrical cord
58 base member
60 socket cradle arm
62 swivel knob cradle arm
64 foot
66 annular slot in socket at 180°
68 pin in socket cradle arm It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An appliance for preparing two waffles which comprises:
   (a) a housing assembly having a bottom housing section, a middle housing section and a top housing section, said bottom housing section and said top housing section each having waffle grid pattern with an annular groove overflow and said middle housing section having two oppositely disposed waffle grid patterns, each with an annular groove overflow, said annular groove overflow being circular and disposed concentrically to said housing assembly;
   (b) means for electrically heating the waffle grid patterns in said bottom housing section, said middle housing section and said top housing section, said electrically heating means including a first heating element disposed into said bottom housing section, a second heating element disposed into said middle housing section, a third heating element disposed into said top housing section, a thermostat electrically connected to said first heating element and said second hating element and said third heating element and disposed into top wall of said top housing section so that said thermostat indicates when the waffle are done, and a cylindrical socket mounted to side of said hinge assembly and being electrically connected to said first heating element, said second heating element, said third heating element and said thermostat so that a plug on an electrical cord can be electrically connected thereto;
   (c) a hinge assembly affixed to one side of said middle housing section with said bottom housing section and said top housing section pivotally connected to said hinge assembly;
   (d) a swivel knob assembly having a lower half segment affixed at opposite side of said bottom housing section, an upper half segment affixed to said top housing section and a central rod extending from said middle housing section between said lower half segment and said upper half segment;
   (e) means for supporting said hinge assembly and said swivel knob assembly in an elevated position with respect to a flat surface and allowing said housing assembly to swivel thereabout, said supporting means including a substantially "U"-shaped base member having a pair of cradle arms vertically extending upwardly at opposite sides thereof, said substantially "U"-shaped base member and said pair of cradle arms being one homogeneous piece of material, one of said cradle arms swivelly supporting said socket while other of said cradle arms swivelly supporting said swivel knob assembly and a plurality of removable and height adjustable feet disposed to underside of said substantially "U"-shaped base member so as to stabilize said substanitally "U"-shaped based member on the flat surface and to adjust the substantially "U"-shaped base member when positioned on an irregular surface; and
   (f) means for limiting said housing assembly to manually swivel 180° so that when said housing assembly is in a first position with said bottom housing section on top, said bottom housing section is opened, allowing waffle batter to be poured onto one of the waffle grid patterns in said middle housing section and then said bottom housing section is closed, said housing assembly is then swiveled back to a second position with said top housing section on top, said top housing section is opened allowing waffle batter to be poured onto the of the waffle grid patterns in said middle housing section and said top housing section is then closed allowing the two waffles to be prepared, said manual swivel means including a socket being circular and having an annular slot formed therein at 180° thereabout and a pin fitting into said annular slot to limit swivel movement of said socket to 180° and preventing free wheeling of said housing assembly.

* * * * *